Sept. 21, 1965  E. F. KRYMAN  3,207,171
BACK-FLOW PREVENTING VALVE
Filed May 9, 1962
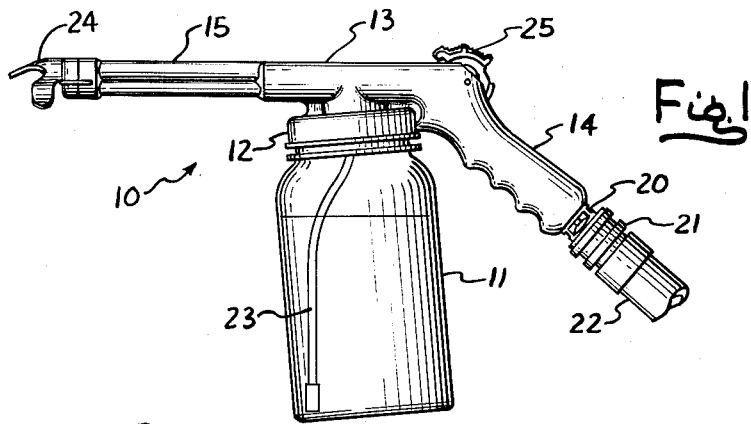
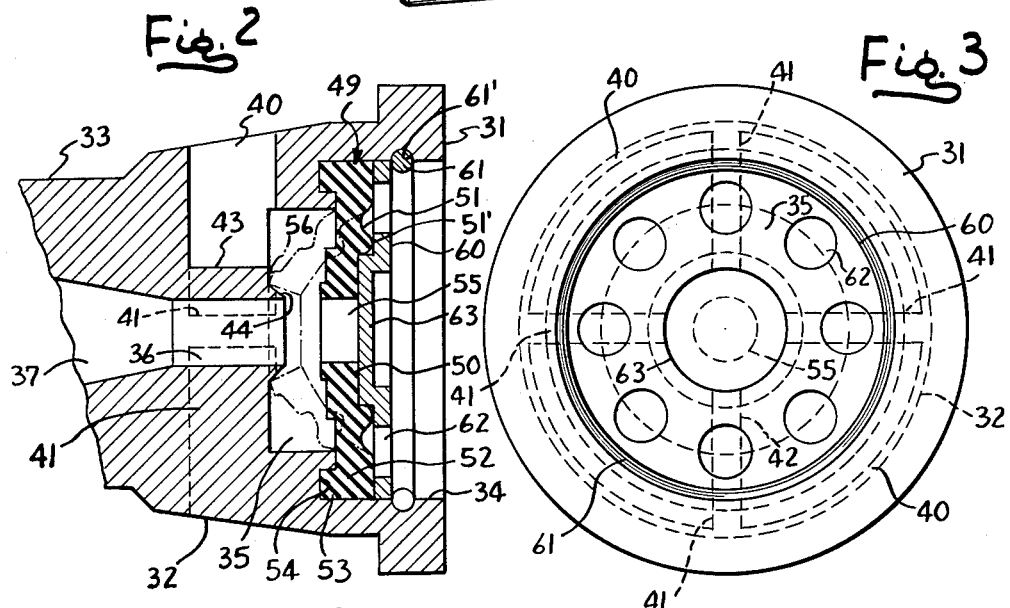
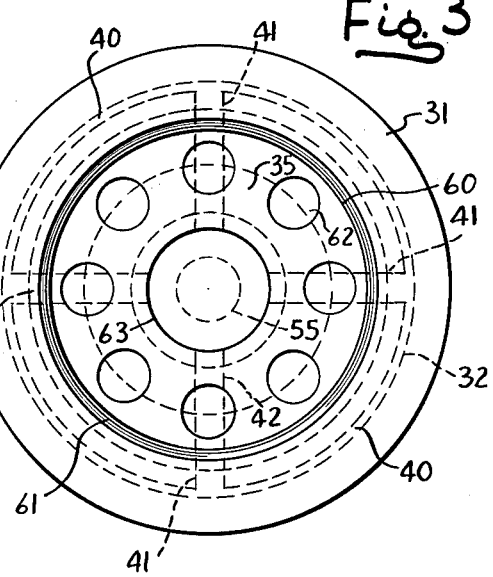
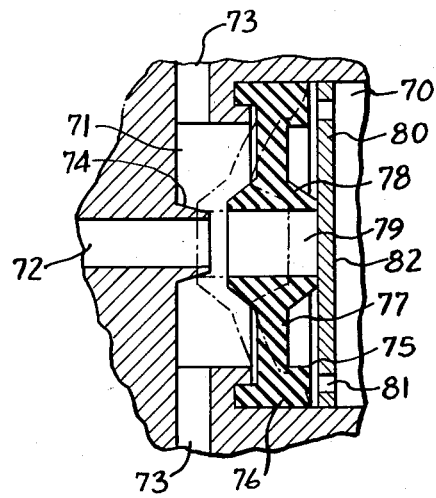
INVENTOR.
EDWIN F. KRYMAN
BY
ATTYS United States Patent Office 3,207,171
Patented Sept. 21, 1965

3,207,171
BACK-FLOW PREVENTING VALVE
Edwin F. Kryman, Batavia, N.Y., assignor to R. E. Chapin Manufacturing Works, Inc., Batavia, N.Y., a corporation of New York
Filed May 9, 1962, Ser. No. 193,584
3 Claims. (Cl. 137—218)

This invention relates to apparatus for preventing back-flow of fluids in a conduit by valve and/or vacuum breaking action, and is particularly advantageous when incorporated in a garden spray device of the type which is attachable to a water hose and to a jar or other container holding a garden chemical in liquid form and, by Venturi action, draws the garden chemical from the container into the stream of water passing therethrough.

It is common to incorporate back-flow preventing apparatus in garden spray devices as above described to prevent the garden chemical from being drawn into the system by low pressure conditions which sometimes develop in the water mains. Such back-flow preventing apparatus frequently includes a valve positioned in the inlet end of the water dispensing device, the valve being opened under forward pressure and closed under back pressure. Additionally, such back-flow preventing apparatus commonly includes vents located downstream from the back-flow preventing valve which vents are covered during forward pressure by a movable valve body and uncovered under back pressure to expose the fluid carrying passageway to atmospheric pressure upon reverse movement of the valve body to prevent the application of low pressure or vacuum conditions to the portion of the dispensing device involved downstream from the vents which would otherwise cause initial leaking of the undesired chemical past the back-flow preventing valve. Obviously, this back-flow preventing apparatus must be exceedingly reliable, have a long service life and be free from maintenance problems. Also, the movable valve body should be quick acting since slow action thereof results in the momentary escape of water through the vents when the water is initially turned on.

It is, accordingly, an object of the present invention to provide an improved back-flow preventing apparatus which is reliable, has a long service life, and is substantially free of maintenance problems.

Another object of the invention is to provide back-flow preventing apparatus as just described wherein a valve seating arrangement is provided which is fast acting under forward pressure to prevent any significant leakage of water through the vents in the apparatus, and is operative under back pressure to expose the fluid passageway of the apparatus to atmospheric pressure to prevent back-flow by vacuum breaking action.

In accordance with the present invention, the portion of the fluid carrying passageway immediately downstream from the vents of the device involved is provided with a rearwardly projecting valve seat which tapers toward the inlet end of the device. A resilient, flexible, substantially ring or annular shaped valve body having a centrally disposed passage for flow of fluid therethrough is positioned in the passageway upstream from the tapered projecting valve seat and the vents. The valve body is adapted to distend under forward fluid pressure to a downstream position where it seats around the tapered projecting valve seat to seal-off the fluid carrying passageway from the vents. Upon termination of forward fluid pressure, the valve body returns to a substantially undistended upstream position where the vents are uncovered to vent the fluid carrying passageway to the atmosphere. In this upstream position, the upstream or rear surface of the valve body rests in fluid sealing relation against the unperforated portion of a perforated disc. The action of the just described coacting elements of the apparatus provides a simpler, less expensive and more reliable means for sealing off and venting the conduit passageway to atmospheric pressure than apparatus heretofore used.

Other objects, advantages and features of the invention will become apparent upon making reference to the specification to follow, the claims and drawings wherein, FIG. 1 is an elevational view of a garden chemical sprayer connectable to a water hose coupling and incorporating the back-flow preventing apparatus of the present invention;

FIG. 2 is an enlarged fragmentary longitudinal sectional view showing in solid lines the position of the back-flow preventing apparatus of the invention under zero or back pressure conditions, and in dotted lines the position thereof under forward pressure conditions;

FIG. 3 is an end elevational view of the apparatus illustrated in FIG. 2; and

FIG. 4 is a fragmentary longitudinal sectional view of another embodiment of the back-flow preventing apparatus of this invention.

Referring now to the drawings, FIG. 1 illustrates a garden chemical sprayer incorporating the back-flow preventing apparatus of this invention. It should be understood, of course, that any discussion of the apparatus of this invention in connection with such a device is for purposes of illustration only and not by way of limitation, it being apparent that the back-flow preventing apparatus of this invention has utility in other fluid systems.

The sprayer designated generally at 10, includes a glass jar 11 containing a solution of an insecticide, fertilizer or other garden chemical. The jar has an open top defined by an externally threaded neck portion around which is threaded an internally threaded cap body portion 12 of an integral pistol-shaped sprayer body 13 made of cast metal or other suitable material. The body 13 has a hollow hand gripping portion 14 and a nozzle barrel portion 15 which define a longitudinal passageway which carries water between the inlet and outlet ends of the sprayer.

The inlet end of the hand gripping portion 14 is provided with the unique back-flow preventing apparatus of the invention generally designated at 20. An internally threaded coupling 21 is connected to the end of the hand gripping portion 14 and is adapted to be attached to an externally threaded fitting on a garden hose 22, which, in turn, is connected to a source of carrier fluid such as water.

A metering element (not shown) may be secured within the passageway of the barrel portion 15 and by providing a point of reduced pressure effects withdrawl of chemical solution from the jar 11 through an inlet tube 23. The tube 23 carries the chemical solution to a point in the passageway of the portion 15 where it is entrained in the carrier fluid. A deflector 24 may be attached to a nozzle of the barrel portion 15 to deflect and fan out the discharge fluid leaving the sprayer. An on-off valve control 25 may be provided intermediate the hand gripping portion 14 and the barrel portion 15 to regulate the flow of fluid through the sprayer.

Referring now in particular to FIG. 2 of the drawings, the inlet end of the hand gripping portion 14 of the sprayer body is provided with a flanged inlet section 31, a tapered intermediate section 32, and a substantially cylindrical section 33. The flanged inlet section 31 is adapted to receive and retain the internally threaded coupling 21 to facilitate attachment of the sprayer 10 to a water hose.

The flanged inlet section 31 has a bore or passage 34 which extends into the intermediate section 32 and communicates with a bore or passage 35 of lesser diameter in the section 32. Substantially coaxial of and communicating with the bore or passage 35 is a cylindrical bore or passage 36 of lesser diameter than passage 35 and which communicates with an outwardly flaring bore or passage 37 extending through the section 33.

In the preferred embodiment of apparatus illustrated in FIG. 2, there is formed in the defining walls of the tapered intermediate section 32 four circumferentially elongated, outwardly flaring vents 40. With this outwardly flaring vent construction, the vents can be made to occupy a near maximum circumferential extent so as to obetain maximum vacuum-breaking action for vents of a given width. The vents 40 are demarcated or separated one from the other by ribs of metal 41 which desirably are of sufficient cross-section to withstand the abuse which is reasonably anticipated. The vents 40 open onto the peripheral portion of the passage 35 in the section 32 thereby normally venting the passage 35 to the atmosphere. The defining walls of the upstream end of the passage 36 in the section 32 form a rearwardly projecting and annular valve seat 44, the function of which will be made clear as the description proceeds.

A back-flow preventing valve member 49 made of a resilient material like rubber is mounted in the downstream end of the passageway 34 upstream from the vents 40 and the valve seat 44. This valve member most advantageously comprises a central ring or annular forming portion 50, an intermediate pleated portion 51, a thickened peripheral portion 52 having an annular extention 53 adapted to fit within a correspondingly shaped annular recess 54 in the intermediate section 32 of the sprayer body. The central valve forming portion 50 is provided with a centrally disposed passage 55 in substantial axial alignment with the passage 36. The passage 55 has a smaller diameter than the end of the valve seat 44. The pleated portion 51 of the valve member is shaped to form a rearwardly projecting pleat 51' adjacent the perimeter of the annular valve forming portion 50. The pleat enables the central valve forming portion of the valve member to move bodily forward into the dotted line position of FIG. 2 where the defining walls of the passage 55 seals around the valve seat 44.

A rigid backing disc 60 made of metal or similar material is mounted in the passage 34 behind the valve member 49. The disc 60 is fixedly held against the valve member 49 by a snap ring 61 press fitted into an annular recess 61' in the wall defining the passage 34. The peripheral portion of the disc 60 is provided with a plurality of spaced perforations 62. The central portion 63 of the disc is unperforated and normally makes sealing contact with the rear face of the central valve forming portion 50 of the valve member 49 to close off the rear end of the valve member passage 55.

The operation of the back-flow preventing apparatus is as follows:

When the sprayer is connected to a source of water under pressure, the water passes through the perforations 62 in the disc 60 and forces the pleated and central portions 50 and 51, forwardly thereby providing clearance for passage of water between the backing disc 60 and valve member 49 into the passage 55 thereof. The defining walls of the passage 55 expand and seal around the tapered annular valve seat 44 to seal off the vents 40 from the sprayer interior. Distension of the valve member 50 is almost instantaneous and occurs readily under even relatively low forward pressures. The rearwardly tapered construction of the valve seat 44 affords an effective sealing surface for the valve member 49 during its forward movement and a smooth surface over which the valve member can readily unseat itself during its rearward movement.

When the on-off valve 25 of the sprayer 10 is open, the fluid, passing through the valve member 49 flows through the hand gripping portion 14 of the sprayer into the barrel portion 15 containing the metering element positioned therein where a reduction in pressure takes place which draws the solution of garden chemical in the jar 11 through the tube 23 into the carrier liquid stream. The resulting fluid mixture impinges against the deflector 24 which fans out the stream.

Upon termination of the inlet water pressure or the development of a low pressure condition in the water main, the resulting back pressure will immediately force the valve member 49 rearwardly away from the valve seat 44 and into fluid sealing relation against the disc 60. The vents 40 are then uncovered to apply atmospheric pressure to the passage 35.

Referring now in particular to FIG. 4 of the drawings, there is illustrated another embodiment of the back-flow preventing apparatus of this invention. In this embodiment, the sprayer body is provided with an inlet bore or passage 70 communicating with an intermediate bore or passage 71 which in turn communicates with a substantially narrower, elonagted, cylindrical bore or passage 72. Adjacent the bore or passage 72 the sprayer body is provided with a plurality of vents 73 by means of which the passageway in the casing is vented to atmospheric pressure. At the inlet or upstream end of the passage 72 there is provided an open ended, rearwardly tapered annular seal 74. A resilient, flexible valve member 75 is secured in the downstream end of the passage 70 upstream from the seat 74. The member 75 has a thickened, peripheral portion 76, a relatively thin intermediate section 77, and a forwardly and rearwardly tapered centrally disposed portion 78 defining a cylindrical passage 79 in substantial axial alignment with the passage 72. The passage 79 has a diameter intermediate the largest and smallest ends of the valve seat 78. The valve member 75 is fixedly held in position in the bore or passage 70 by a substantially flat disc 80 having perforations 81 peripherally disposed therein. The central portion 82 of the disc 80 is unperforated to provide a sealing surface for the rearwardly tapered part of the centrally disposed portion 78 of the valve member 75.

The operation of the apparatus illustrated in FIG. 4 is essentially similar to that of the embodiment shown in FIG. 2. The resilient flexible valve member 75 flexes forwardly in response to the pressure exerted upon it by fluid passing through the perforations 81 in the disc 80, and moves downstream where it wedges around the valve seat 74 as clearly shown by the dotted lines in FIG. 4. The generally cylindrical configuration of the passage 79 is maintained when it engages with the tapered valve seat 74. Under back pressure the valve member 75 quickly unseats itself from the valve seat 74 and abuts disc 80 to seal-off the passage 79.

The present invention thus provides an exceedingly simple and inexpensive back-flow preventing valve construction which effectively and rapidly seals off the vent openings from the passageways under forward pressure, and just as effectively and quickly vents the passageways under back pressure, and without requiring close tolerances in the dimensions thereof.

It should be understood that numerous modifications may be made of the preferred form of the invention above described without deviating from the broader aspects of the invention.

I claim:

1. In a fluid-conveying conduit forming an enclosed open-ended passageway, back-flow preventing means comprising: a first passageway section having an outlet end joining the inlet end of a second smaller passageway section and which is substantially aligned with the longitudinal axis of the second passageway section, the defining wall portion of the inlet end of said second passageway section forming an externally rearwardly tapered valve seat projecting into said first passageway section, vent openings in said conduit opening onto the outer portion of said first passageway section, said vent openings normally venting the conduit passageway to atmospheric pressure, and a resilient distendable valve member having a central portion with a generally permanently cylindrical valve passage therein for flow of fluid therethrough, said valve passage having a diameter which, in the undistended position of the valve member, is intermediate the largest and smallest outer dimensions of said rearwardly tapered valve seat, said valve member being designed to have a rigidity wherein the diameter of said valve passage remains intermediate the largest and smallest outer dimensions of said valve seat under a pre-determined forward fluid pressure which moves the same against said valve seat, wherein said tapered valve seat fits snugly within said valve member opening when the central portion of the valve member moves under forward pressure to a downstream position, said valve member being positioned in the conduit passageway at a point upstream from but contiguous to said vent openings and said second passageway section, said central portion being bodily movable under said pre-determined forward fluid pressure to said downstream position where said central portion thereof seals around said tapered valve seat to seal off the conduit passageway from said vent openings, and under zero or back pressure to an upstream substantially undistended position to uncover the vent openings.

2. The combination of claim 1 wherein said valve member is a resilient, flexible, ring-shaped member having a continuous, thickened peripheral portion, a relatively thin flexible imperforate intermediate portion, and a centrally disposed valve forming portion defining said generally permanently cylindrical passage.

3. The combination of claim 2 wherein there is provided a backing disc behind said valve member having a peripheral perforated portion opposite said imperforate intermediate portion of the valve member and an imperforate central portion opposite said centrally disposed portion, the perforations of said perforated portion of the disc forming pass-through openings for forward flow of fluid therethrough under forward pressure but which are sealed by said valve member when the intermediate portion and the centrally disposed portion of the valve member are forced against the perforated and imperforate portions of said disc by back pressure.

References Cited by the Examiner

UNITED STATES PATENTS 2,174,743    10/39    Groeniger _____ 137—525.1 X

FOREIGN PATENTS 557,046    5/57    Belgium.

ISADOR WEIL, *Primary Examiner.*

MARTIN P. SCHWADRON, *Examiner.*